J. Dodge,
Grinding Knives, &c.
No. 733. Reissued May 31, 1859.
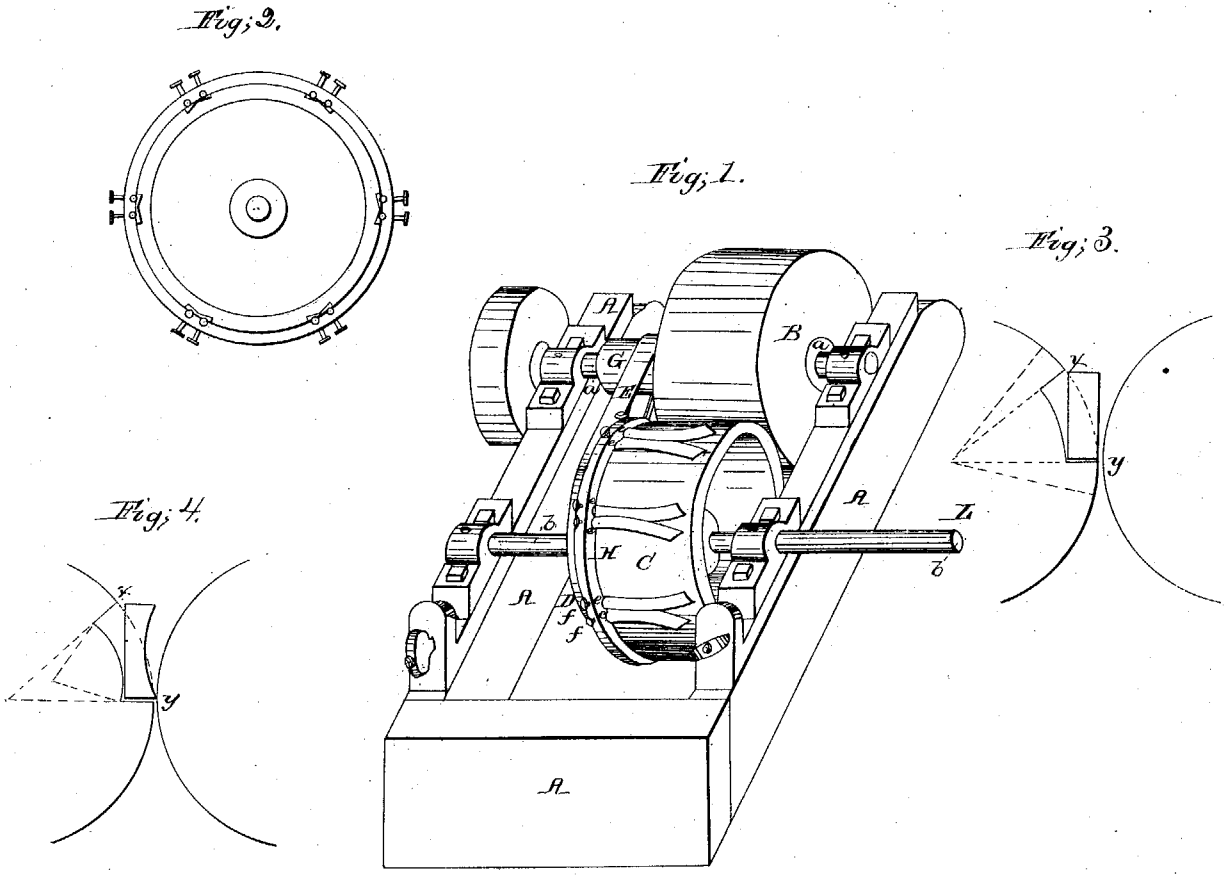
Witnesses;
Wm. F. Haskell
D. Blake
Inventor;
James Dodge

BEST AVAILABLE COPY

UNITED STATES PATENT OFFIC

JAMES DODGE, OF WATERFORD, ASSIGNOR TO HIMSELF, A
BLAKE, OF ALBANY, NEW YORK.

IMPROVEMENT IN GRINDING AND POLISHING KNIVE.

Specification forming part of Letters Patent No. 21,746, dated October 12, 1858; Reissue No. 733, dated May 31, 1859.

*To all whom it may concern:*

Be it known that I, JAMES DODGE, of Waterford, Saratoga county, State of New York, have invented a new and useful Method for Grinding and Polishing Knives, or other Articles of Cutlery and Tools; and I declare the following specification, with the drawings hereto attached as part of the same, to be a full and perfect description thereof.

Figure 1 is a perspective view of the machine. Fig. 2 is an end view of the cylinder. Figs. 3 and 4 are diagrams illustrating the operation of the machine.

Upon a strong frame, A A A A, a grindstone, B, is mounted on a shaft or axis, *a a*, properly fitted with journals and boxes and band-wheels or gearing to revolve it with requisite velocity. Upon the same frame another shaft, *b b*, is arranged, with suitable journals and boxes, lying parallel with shaft *a a*. To this shaft is attached a cylinder, C, arranged to revolve by means of the band-wheel D, with its band E passing around drum G, on shaft *a*, (or by other suitable gearing,) by which the relative movements of the stone to the cylinder can be adjusted as required. This cylinder is intended to hold and carry knives or other articles to be ground by the stone. Upon the margin of the cylinder a flange, H, projects, having suitable openings, *e e*, through it at the surface of the cylinder for the insertion, in the case of knife-blades and similar articles, of their stems, to be confined with set-screws tapped through the flange so as to lie properly upon the face of the cylinder to receive the action of the grindstone.

In order to adjust the articles with more exactness and certainty, there is sunk into the face of the cylinder a matrix or impression of the article as prepared for the grinding. This will prevent the article from sliding along the surface of the wheel under the attrition of the grindstone. The grinding being effected by the revolution of the article on a curve, the result will be, if it be held immovably on the face of the cylinder, that the ground surface will be a convex of the curve or arc of the cylinder subtended by the article to be ground. The convexity of the form can be diminished, and the surface can be ground flat by giving the cross-section of the matrix *x y* an increasing convex shape, as shown in Fig. 3, and allowing the article being ground to rock on its curve as it passes under the stone. If the convexity of the bottom of the matrix be increased, (see Fig. 4,) the surface can be concave, like a razor-blade.

For certain purposes it becomes convenient not to change the cylinder with every change of article to be ground. In that case I have the matrices formed upon segments of metal fitted to the curve of the cylinder, so as to be affixed or removed without disturbing the cylinder.

In order to allow of the employment of grindstones or other analogous reducing-surfaces of moderate width when articles longer than that width are to be ground, the shaft of the cylinder is extended, as shown at L, so as to permit the cylinder to be moved over the surface of the stone; or, vice versa, the stone may be arranged to be moved over the surface of the cylinder, and in either case the stone may revolve or not, according to circumstances.

In order to allow the proper play of the article in hand to form the desired surface flat or concave, the stem of the blade can be fitted into movable sockets, kept in place by the set-screws *f f*, so as to be held down in the matrix and yet turn sufficiently for grinding purposes. For the polishing process, an emery-wheel, or wheel covered with suitable polishing material, is to be substituted for the grindstone.

What I claim as my invention is—

1. Grinding and polishing articles and forming their surfaces upon or against the periphery of a grindstone or polishing-wheel or other analogous reducing-surface by attaching them to the periphery of a revolving drum or cylinder, substantially as herein set forth.

2. Making matrices in the periphery of a wheel to which a series of articles to be ground are attached, said matrices being adapted to give the required shape to the articles to be ground, so as to grind, polish, and shape such articles in a uniform manner, substantially as and upon the principles herein set forth.

3. In combination with said matrices, attaching and supporting the articles to be ground upon the cylinder in such manner as to allow them to rock or accommodate themselves thereon, whereby their surfaces may be shaped either convex, flat, or concave, substantially as herein set forth.

JAMES DODGE.

Witnesses:
JAMES BLAKE,
JAMES KIERNAN.